INVENTOR
M. Dimentberg

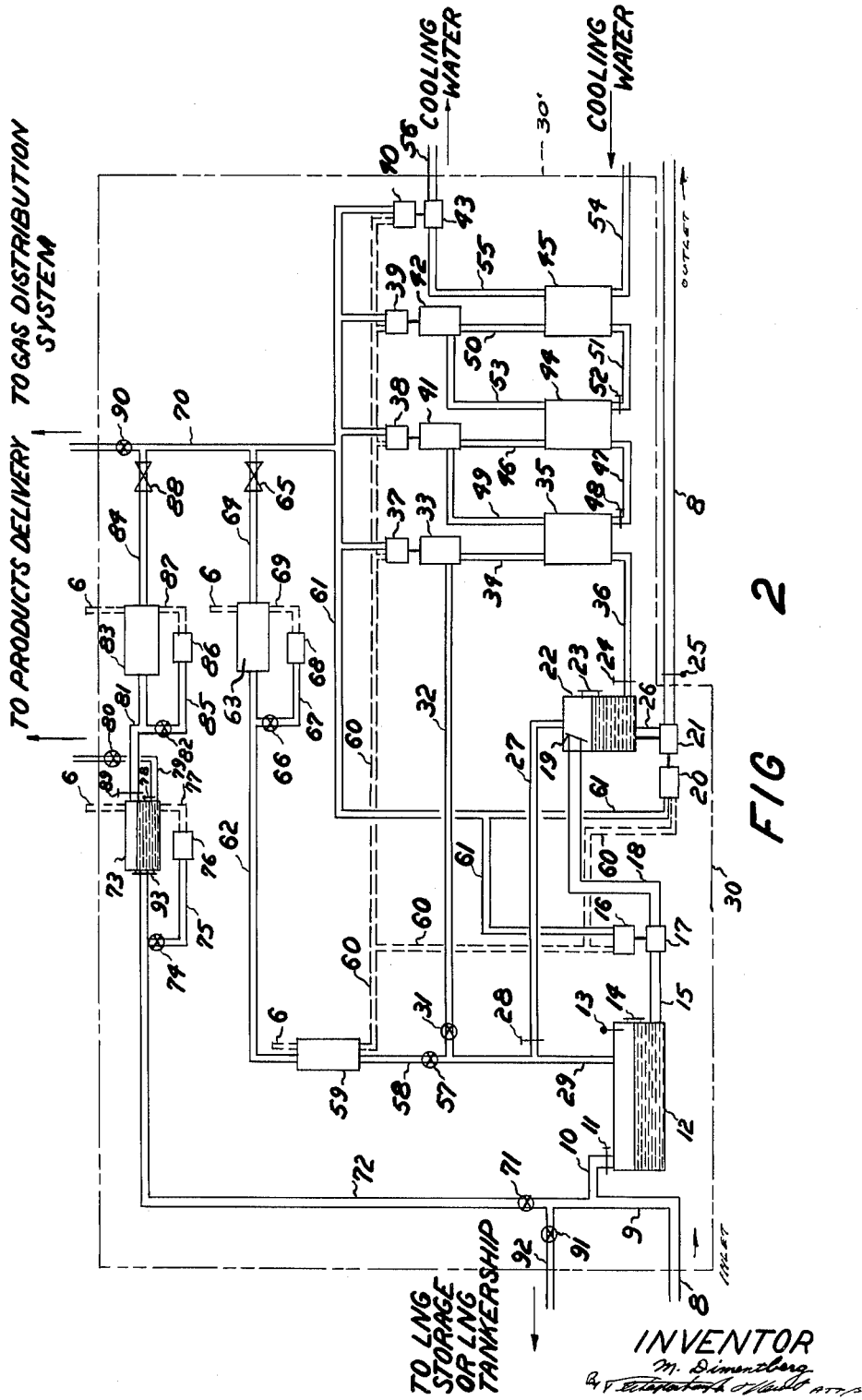

3,256,705
APPARATUS FOR AND METHOD OF GAS
TRANSPORTATION
Moses Dimentberg, 347 Cathedral Ave., Winnipeg 4,
Manitoba, Canada
Filed Dec. 27, 1963, Ser. No. 333,869
7 Claims. (Cl. 62—55)

This invention relates to a method of transporting gases over relatively long distances by liquefying, sub cooling, and pumping them through transmission pipelines. In a preferred embodiment, the invention relates to the transportation of natural gas.

At present natural gas is transported in the gaseous phase by means of high pressure pipelines in which the gas is at the ambient temperature of the medium in which the transmission pipeline is located. Compressor stations, strategically located along the length of the pipeline, recompress the gas to its maximum pressure, thus replenishing the pressure lost as the result of friction caused by the passage of the product.

Another method of transporting natural gas which has come to the fore in recent years, consists of liquefaction and transportation in specially designed tankerships. The liquefied natural gas (henceforth referred to as LNG), is maintained at approximately atmospheric pressure at its boiling point temperature ($-258°$ F.).

Liquids and liquefied gases such as propane and butane, are presently being transported by means of long distance pipelines. However, in all cases the products are at the ambient temperature of the medium in which the pipeline is located. Under ambient temperatures, and at the pressures required for pipeline transmission, the products are naturally in the liquid phase. No attempt has been made to liquefy, sub cool, and pipe over long distances, gases such as natural gas, which cannot exist as liquids under ambient pipeline temperatures (because their critical temperatures are below ambient pipeline temperatures).

I have discovered that by liquefying and sub cooling natural gas, it may be transported as a liquid in refrigerated transmission pipelines. The method of refrigerated pipeline transmission described below results in many benefits compared to existing methods of transporting natural gas.

Firstly, the diameter of a pipeline transmitting LNG, will be considerably less than that of a high pressure line carrying the same quantity of product in the gaseous phase. Since the major portion of the capital cost of transmission pipelines is directly related to the pipeline diameter for a given length of line, substantial savings will result in the use of refrigerated pipeline transmission for natural gas.

A second important saving in the use of refrigerated pipeline transmission results from the fact that transmission horsepower (the horsepower required to force the product through the pipeline), will be considerably less than for an equivalent high pressure gaseous phase transmission. Substantial savings in the capital and operating costs of the mechanical plant will result.

Since considerably less power will be required for refrigerated pipeline transmission, the quantity of gas burned to provide transmission energy will be reduced, with the result that a gain in net throughput quantity will occur.

To understand this, one must first consider how energy losses occur under high pressure gaseous phase transmission. Primarily, these are of two types: compression losses, and friction losses in the pipeline. Compression losses arise from the fact that the thermal efficiency in converting heat energy to mechanical energy is approximately 30%, i.e. 30% of the energy from the gas burned at compressor stations is converted to mechanical energy for gas transmission. The remainder escapes as losses in the gas engine exhaust, and in the cooling water outflow. Losses in the pipeline result from friction against the pipeline wall caused by the flowing gas. An increase in pipeline friction results in a corresponding decrease in downstream pipeline pressures, and an increased need for compression equipment along the pipeline.

In the case of refrigerated pipeline transmission, exhaust gases from the gas engines used to drive the pumps at the pumping stations, may be used to reheat some of the LNG from the pipeline for use by a local distribution company. In this way a considerable portion of exhaust gas heat may be recovered for useful purposes. Unlike most pipelines operating at ambient temperatures heat caused by fluid friction in the pipeline will not escape into the surrounding medium. Because of the low temperature of LNG there will be a net inflow of heat so that instead of energy losses in the transmission line, there will be a net gain in energy.

In cases where a large demand for gas exists in the vicinity of a pumping station, the inflow of heat upstream of the station will be utilized in vaporizing the quantity of gas to be delivered for consumption. Where a large demand for gas does not exist in the vicinity of a pumping station, refrigerating equipment requiring additional investment, will be required to remove the added heat from the LNG stream. The total horsepower required at the pumping station will still, however, be less than that required in the compressor stations of a gaseous phase transmission pipeline having the same throughput capacity.

In the above discussion of the economic advantages of refrigerated pipeline transmission, no mention has been made of the costs involved in the initial liquefaction and refrigeration process, and in the final vaporization process. Thus the above comparison is directly related to the operation of high pressure pipelines supplying LNG storage or LNG tanker operations since in such cases these costs would cancel out.

When the comparison is made between the costs of operating a refrigerated pipeline supplying LNG and a high pressure gaseous phase pipeline supplying natural gas directly for consumption, the costs of the intial liquefaction plant, and the final regasification plant are factors which tend to reduce the economic advantages of refrigerated pipeline transmission. Offsetting this is another important advantage of refrigerated pipeline transmission, i.e., the pipeline may be operated at full capacity throughout the year, independently of the fluctuation of consumer demand, because of the relative ease of storing LNG. High pressure gaseous phase pipelines must operate at reduced load factors or sell gas in offpeak periods at reduced rates to large industrial users because of the difficulties associated with storing natural gas, due primarily to the relatively large volume involved.

Liquefied storage facilities may be constructed at the delivery end of existing pipelines. However, for new pipelines the advantages of initial liquefaction of the product will rule in favor of refrigerated pipelines.

Besides the economic advantages of refrigerated pipeline transmission, there is also an advantage in safety of operation. High pressure gaseous phase pipelines have been known to explode with serious results. Besides the explosive effect of a pipeline break, there is also the possibility of large scale burning of the escaping gases. LNG, because it is a liquid, will not create an explosive effect when a pipeline break occurs. Furthermore, LNG is less flammable than natural gas, in the gaseous phase, so that the danger of serious fire is reduced considerably.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 2 is a schematic drawing of a pumping station.

In the drawings like characters of reference indicate corresponding parts in the different figures.

Figure 1:
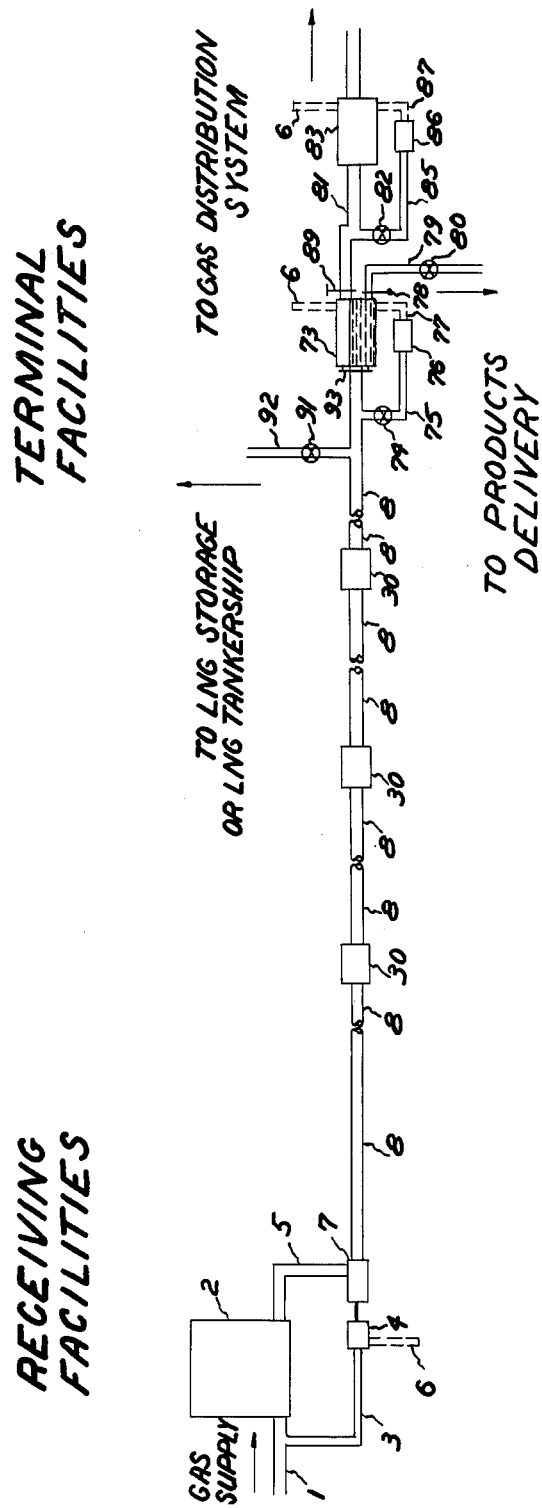
FIGURE 1 is a schematic drawing showing my invention.

Firstly, gas, free of undesirable impurities, is received at the intial liquefaction plant 2 through pipe 1. The gas is liquefied in plant 2 and passed through line 5 to pump 7. Methods for removing impurities such as hydrogen sulfide, water vapor, and other substances which would freeze under the cold temperatures existing in the pipeline, are in common use at present. Furthermore, several methods for liquefying natural gas are presently known so that the details of these processes need not be described herein.

As the liquefied natural gas leaves the liquefaction plant, it is at a low pressure and the corresponding saturation temperature. Pump 7 increases the pressure of the LNG without materially increasing its temperature so that as the LNG enters transmission pipeline 8 it is in a sub cooled condition, i.e., at a temperature substantially below the saturation temperature for its existing pressure condition. In most areas transmission pipelines will be located underground at depths of from 3 to 6 feet.

The LNG is forced through transmission pipeline 8 by the pumping action of pump 7 and other pumps, 21 locted in pumping station 30 along the length of the transmission pipeline. The spacing of pumping stations will be dependent upon economic considerations, soil conditions, and the location of market areas along the length of the pipeline. The diameter of pipeline 8 need not be constant, and may be reduced at its down stream end if substantial quantities of LNG are removed at intermediate pumping stations. Pumping stations will be spaced at substantially equal distances for any length of the pipeline having the same diameter. As an example of station spacing, distances between stations of 50 miles for an 18 inch diameter pipeline will be satisfactory.

As the LNG flows through pipeline 8, its temperature will rise due to heat gain from the surrounding soil, and because of the heating effect of fluid friction against the pipeline wall. At the same time its pressure will decrease.

The maximum temperature in pipeline 8 will occur at the inlets to the pumping stations. Pumping station spacing, and pipeline diameter, will be determined so as to ensure that the temperature in pipeline 8 at the inlet to the station, is below the saturation temperature corresponding to the gas pressure at that point, and that sufficient pressure is available to allow an expansion to occur in flash chamber 12. By maintaining the LNG temperatures below saturation temperatures corresponding to LNG pressures at any point in the pipeline, the product will be maintained in the liquid phase throughout. This in turn will result in minimum pipeline diameters and required pumping capacity.

A diagram of a typical pumping station showing the essential units of equipment is contained in FIG. 2 enclosed by the dotted line 30'.

In describing the operation of a pumping station, three basic conditions must be considered: (a) gas is not required for consumption in the vicinity of the pumping station, (b) a small quantity of gas is required for consumption, (c) a large quantity of gas is required for consumption. Each of these conditions will be considered separately.

Under the first case, valves 91, 71 and 90 are closed, valve 57 is partly closed, while valve 31 is open. LNG flows from pipeline 8 through pipes 9 and 10, and through throttle valve 11 into flash chamber 12. The pressure of the LNG is reduced considerably as it passes through throttle valve 11 into the flash chamber. This results in a corresponding lowering in temperature of the product, and an accompanying vaporization of a portion of it.

The major portion of the vapor passes through pipe 29, valve 31, and pipe 32, into the inlet of gas compressor 33. Compressor 33 is driven by gas engine 37. The pressure in flash chamber 12 is maintained within desired limits by using pressure or temperature sensitive control 13 to regulate the operation of gas engine 37 so that as pressure builds up in flash chamber 12 towards the upper limit of the desired pressure range, engine 37 speeds up to draw off more vapor. The pressure and corresponding temperature in flash chamber 12 is set at a value sufficiently low, so that when the LNG leaving the chamber mixes with the reliquefied product passing through pipe 36, the desired temperature of the mixed products in pipeline 8 downstream of the pumping station results.

The LNG from flash chamber 12 flows through pipe 15 into pump 17 which is driven by gas engine 16. Pump 17 raises the pressure of the LNG it pumps without materially increasing its temperature, and forces it through pipe 18 and spray 19, into mixing chamber 22. The level of LNG in flash chamber 12 is controlled within desired limits by means of liquid level sensitive control 14 (such as a float control), which regulates the operation of gas engine 16 so that as the liquid level increases towards the maximum desired value, gas engine 16 is speeded up. This in turn causes pump 17 to remove LNG from flash chamber 12 at a faster rate thus counteracting the tendency to increase the liquid level in the flash chamber.

By controlling the liquid level in flash chamber 12 in this way the rate of operation of pump 17 is automatically varied to handle the quantity of LNG passing through the flash chamber.

Since under case (a) there is no demand for gas in the vicinity of the pumping station the major portion of the vapor passing out of flash chamber 12 into pipe 29 must be reliquefied and returned to the pipeline. The remainder is used as fuel in the pumping station.

In the diagram a cascade system of refrigeration in simplified form has been shown although other refrigerating processes may be used instead. Two refrigerants, such as ethylene and propane may be used with cooling water as the final cooling medium. Natural gas is compressed in compressor 33 and passes through pipe 34 into condenser 35. Here it is cooled and liquefied by the action of the ethylene refrigeration cycle. The principles of refrigeration cycles are well known and need not be described herein. The ethylene refrigeration system consists of compressor 41, ethylene condenser 44, throttle valve 48, and connecting piping 46, 47 and 49. The ethylene in turn is cooled by the propane refrigeration cycle which consists of compressor 42, propane condenser 45, throttle valve 52 and connecting pipes 50, 51 and 53. Cooling water is pumped by means of pump 43 through pipes 54, 55 and 56, and propane condenser 45, to finally remove the heat from the process. Items 38, 39 and 40 are gas engines used to drive respectively compressors 41 and 42, and pump 43.

Reliquefied natural gas flowing from condenser 35 passes through pipe 36 and pressure relief valve 24 into mixing chamber 22. Pressure relief valve 24 is set to maintain a desired pressure of natural gas in condenser 35. Mixing chamber 22 also receives LNG at a lower temperature through pipe 18. In mixing chamber 22, the two liquid streams mix. The warmer stream from pipe 36 gives up some of its thermal energy to the colder stream from pipe 18 so that the resulting mixed product is at an intermediate temperature. In this way a temperature of the mixed product below that obtainable by using an ethylene refrigeration cycle is achieved. The mixed product passes out of mixing chamber 22 through pipe 26 into pump 21, which pumps it into the next stage of transmission pipeline 8. Pump 21 is driven by gas engine 20. The liquid level in mixing chamber 22 is controlled within desired limits by means of liquid level sensitive control 23 which regulates the operation of gas engine 20 in the same manner as previously described for liquid level sensitive control 14 and gas engine 16. The control of gas engine 20 in this way results in an automatic adjustment of the pumping speed of pump 21 to accommodate the quantity of LNG passing through the pumping station. Pipe 27 and pressure relief valve 28 are provided to allow excess vapor to escape from mixing chamber 22 into pipe 29. Pressure relief valve 28 is set at a higher value than the operating pressures expected to occur in chamber 22, and comes into operation when a malfunction occurs in the refrigeration system. Temperature sensitive control 25 is located at the outlet of pump 21. The temperature sensitive control is set at the desired temperature, and regulates the operation of the cascade refrigeration system by regulating the speed of operation of gas engine 38. As the temperature at temperature sensitive control 25 tends to increase above the minimum desired value, compressor 38 is speeded up to increase the refrigerating action of the ethylene refrigeration system in order to counteract the tendency towards an increase in temperature of the LNG in pipeline 8.

Similar controls within the propane and cooling water systems speed up the operation of the units in these systems so that a net increase in heat removed by the cooling water outflow results.

Earlier it was stated that only a portion of the vapor passing out of flash chamber 12 into pipe 29, flows into compressor 33. A small portion of this vapor is in fact required as fuel for gas engines 37, 38, 39, 40, 16 and 20. This portion flows through partly open valve 57 and pipe 58 into heat exchanger 59. The vapor is warmed in heat exchanger 59 by the action of hot exhaust gases which are collected by header 60 from the aforementioned gas engines, and conducted to the heat exchanger. After the exhaust gases have given up a portion of their heat to the natural gas passing through heat exchanger 59, they pass outside of the pumping station through pipe 6 into the atmosphere. In FIG. 2, header 60 is shown by broken lines. Broken lines are also used throughout to represent pipes carrying hot combustion gases. Items referenced by numeral 6 denote pipes carrying combustion gases to outside atmosphere.

The natural gas passing out of heat exchanger 59 is at a sufficiently warm temperature for use as a fuel in the gas engines. For this reason burner 68 is not required, and valve 66 is closed. Warmed gas from heat exchanger 59 passes into pipe 62 and then through heat exchanger 63, pipe 64, and check valve 65, into header 61 where it is conducted to the gas engines for use as fuel.

If a small demand for gas exists in the vicinity of the pumping station, valve 57 is opened more fully, while valve 90 is fully opened to allow gas to pass directly from flash chamber 12 to the gas distribution system. The gas flows under its own pressure through pipe 29, valve 57, pipe 58, heat exchanger 59, pipe 62, heat exchanger 63, pipe 64, valve 65, into pipe 70, and through valve 90 to the gas distribution system. The portion of the vapor from flash chamber 12 not required for consumption flows through valve 31 and is reliquefied as explained previously.

Gas passing through heat exchanger 59 is heated by exhaust gases from header 60. As the quantity of natural gas passing through heat exchanger 59 increases, the exhaust gases from header 60 may be insufficient to warm the natural gas to the desired temperature. Valve 66 is then opened to allow a portion of the natural gas to flow through pipe 67 into burner 68. This gas portion is burned in burner 68 and passes through pipe 69 into heat exchanger 63 where the combustion gases heat the mainstream of natural gas passing through.

Demand for gas in the vicinity of the pumping station may increase to the point where all the vapor from flash chamber 12 is required for consumption. In this case valve 31 is closed. The portion of the equipment employed for reliquefying vapor from flash chamber 12 is isolated in this way, and may be shut down.

Vapor from flash chamber 12 passes through pipe 29 and valve 57, through the path previously described to the gas distribution system.

Pressure sensitive control 13 located in flash chamber 12 will be switched over to control valve 57 in order to maintain a predetermined pressure in the flash chamber corresponding to the desired temperature of the LNG. This temperature will be the final delivery temperature of the pumping station in this case. As pressure tends to build up in flash chamber 12, pressure sensitive control 13 will more fully open valve 57 to relieve the buildup in pressure.

If a large demand for gas exists in the vicinity of the pumping station, the vapor passing out of flash chamber 12 would not be sufficient to satisfy it. Under this condition valve 71 is opened to allow more LNG to flow directly through pipe 72 to supply the additional demand for gas. The additional quantity of LNG flows through pipe 72 and into vaporizer 73. A portion of the LNG from pipe 72 bypasses vaporizer 73 and flows through valve 74, and pipe 75 to burner 76, where it is burned to provide the heat necessary for vaporizing the mainstream of LNG flowing into the vaporizer. The combustion gases from burner 76 pass through pipe 77, and through a system of pipes in the vaporizer, where they give up a major portion of their heat to the LNG. The combustion gases then pass to the outside atmosphere through exhaust pipe 6. The LNG in the vaporizer is vaporized by the heat it receives from the combustion gases. The resulting natural gas passes out of the vaporizer through pipe 81 into heat exchanger 83. A portion of the natural gas is again bypassed and burned to provide heat for raising the temperature of the main gas stream. This portion passes through valve 82 and pipe 85 into burner 86 where it is burned. The hot combustion gases from the burner pass through pipe 87 into heat exchanger 83, and after giving up a major portion of their heat to the main gas stream passing through the heat exchanger, they pass to the outside atmosphere through exhaust pipe 6. The warm natural gas from heat exchanger 83 passes through pipe 84 and check valve 88, then into pipe 70 and through valve 90 to the gas distribution system.

Should it be desired to supply LNG directly to storage or to LNG tankerships, valve 91 is opened to allow LNG to flow through pipe 92. It is to be noted that LNG from the pipeline may be transferred directly for high pressure storage in underground caverns. However, in the case of above ground LNG tanks and tankerships, the LNG is required at approximately atmospheric pressure and at a corresponding temperature of −258° F. The LNG as it is received from pipe 92 is at considerably higher temperatures and pressures, and must be passed through a flash chamber and a reliquefaction process in order to lower its temperature and pressure. The details of this process are similar to those already described in connection with the pumping station operation, and need not be repeated.

The terminal facilities of the pipeline consists of vaporizer 73, heat exchanger 83, burners 76 and 86, with connecting piping. The method for vaporizing and warming the products for delivery to a gas distribution system has already been described. Valve 91 and pipe 92 are provided at the terminal of the pipeline to allow LNG to be transferred to LNG storage or tankerships at this point.

In the above discussion it was assumed that the pipeline transmitted only one product, i.e., natural gas. It is possible to use the pipeline to transmit several types of products simultaneously provided they remain liquids under the low prevailing temperatures. These products may be transmitted as distinct quantities separated from each other by impervious plugs, otherwise known as pipeline "pigs," in the same manner as is presently being accomplished in crude oil pipelines. It is also possible to transmit such products as propane, as mixtures with LNG. In the latter case the propane would be separated from the natural gas at vaporizers 73. Relief valve 89, is installed in pipe 81 at the outlet of the vaporizer to maintain the pressure in the vaporizer at a value which will allow the natural gas in the liquid mixture to boil off as it is heated. The higher boiling point liquid such as propane are then withdrawn from the vaporizer as liquids through pipe 79 and valve 80 to the products delivery area for storage or shipment in accordance with prevalent separation techniques.

Temperature sensitive control 78 is located in pipe 79 and is set to automatically open valve 74 when the temperature of the products passing through pipe 79 falls below the preset value. The setting of control 78 is selected at a temperature several degrees above the saturation temperature of methane (the primary constituent of natural gas), corresponding to its pressure in vaporizer 73. At this temperature the outflow from vaporizer 73 will be substantially free of methane. In this way the quantity of gas flowing to burner 76 will be controlled so that sufficient heat is provided to vaporize substantially all the methane and to separate it from the other products in the liquid stream entering the pumping station.

Liquid level sensitive control 93 is located in vaporizer 73 and automatically controls valve 80 to maintain the liquid level in the vaporizer between desired limits. As the liquid level in vaporizer 73 tends to increase towards the upper limit valve 80 is automatically opened wider to allow liquid to flow at a faster rate through pipe 79 and thus counteract this tendency. Additional vaporizers in series with vaporizer 73 may be used if there are more than one component remaining in the liquid products and further separation is desired.

As previously explained pipeline 8 will in general be buried in the earth at depths of from 3 ft. to 6 ft. In order to reduce the size of refrigeration equipment required at pumping stations located in areas where gas consumption is low, some form of insulation on the pipeline upstream of the pumping station, will be required. For most soil conditions, the location of the pipeline within underground conduits which provide six inches of dead air space between the pipeline wall and the conduit wall, will result in acceptable levels of heat gain. As the pipeline approaches an area of large gas consumption, heat gain will be desirable because the energy thus absorbed by the LNG stream, will assist in vaporizing that portion of the stream to be delivered to a distribution system for consumption. In this case the insulating conduit would be eliminated and the pipeline buried in direct contact with the earth.

In the above description of my invention, items which are available commercially such as automatic control units, heat exchangers, etc., have not been described. The heat exchangers indicated in FIGURES 1 and 2 are, with the exception of mixing chamber 22, to be taken as units in which the fluids exchanging heat are separated from each other by impervious materials such as pipes. In the special case described above, natural gas was considered as the throughput product, and gas engines as the prime movers. Other types of prime movers may be used to drive compressors and pumps if the circumstances in a given case indicate these to be more economical. In the case of products such as liquid oxygen which are not combustible, other prime movers such as electric motors, diesel engines, etc., will be required. While in the above description natural gas was used as fuel to supply heat to the vaporizers, other heat sources, such as water, air, or other fuels may be used for this purpose.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A method of transporting liquified gases over a relatively long distance between pumping stations, comprising the steps of first liquefying said gas, then sub-cooling same, then pumping said sub-cooled liquid gas through thermally insulated transmission pipelines, and maintaining the temperature and pressure of the gas such that the gas remains in the sub-cooled liquid state and is prevented from vaporizing within said transmission pipelines.

2. The method as defined in claim 1 in which the gas being transmitted is natural gas.

3. The method as defined in claim 1 which includes the transportation of a plurality of different gases in the sub-cooled liquid state simultaneously, together with the step of separating the different sub-cooled liquefied gases by impervious plugs traveling in said pipelines.

4. The method as defined in claim 1 which comprises the steps of accepting a mixture of gases, liquefying said mixture, sub-cooling said liquefied mixture, and then pumping said sub-cooled liquefied mixture through transmission pipelines, and then separating said plurality of liquefied gases at predetermined points by fractional distillation means 5. Apparatus for transporting of gases over a relatively long distance comprising in combination thermally insulated transmission pipeline, a receiving station at one end of said pipeline, at least one pumping station adjacent the other end of said pipeline, at least one pumping station situated along the length of said pipeline, each said pumping stations containing a throttling means at the inlet side thereof, pumping and refrigerating means for said gas in each of said pumping stations, a temperature sensitive control located at the outlet of each of said pumping stations, the temperature sensitive control of one of said pumping stations cooperating with said throttling means of the next adjacent pumping station downstream thereof to provide means for maintaining the temperature and pressure of the gas such that the gas is maintained in a sub-cooled liquid state throughout said pipeline between said pumping stations, and terminal facilities comprising delivery means.

6. Apparatus as defined in claim 5 in which said pumping and refrigerating means in said pumping station includes a flash chamber wherein the temperature of the incoming liquids is lowered by vaporization of part of said liquid, a liquid pump connected to said flash chamber, a mixing chamber connected to said pump, means to reliquefy the vaporized portion of said liquid, said reliquefied portion and said original liquid portion being mixed within said mixing chamber, and pump means connected between said mixing chamber and said pipeline.

7. Apparatus according to claim 6 in which said transmission pipeline is underground.

References Cited by the Examiner

UNITED STATES PATENTS

| | | | |
|---|---|---|---|
| 1,956,009 | 4/1934 | Diescher | 48—190 |
| 2,392,783 | 1/1946 | Stevens | 48—190 |
| 2,729,068 | 1/1956 | Mitchell | 62—50 |
| 2,799,997 | 7/1957 | Morrison | 62—50 |
| 2,930,682 | 3/1960 | Henderson | 62—55 X |
| 2,958,205 | 11/1960 | McConkey | 62—54 |
| 2,959,020 | 11/1960 | Knapp | 62—54 X |
| 2,975,608 | 3/1961 | Morrison | 62—55 X |
| 3,034,309 | 5/1962 | Muck | 62—55 |
| 3,137,143 | 6/1964 | Jacobs et al. | 62—45 |

MEYER PERLIN, *Primary Examiner.*

LLOYD L. KING, ROBERT A. O'LEARY, *Examiners.*